US007016362B2

(12) United States Patent
Mehravari (10) Patent No.: US 7,016,362 B2
(45) Date of Patent: Mar. 21, 2006

(54) SYSTEM FOR AND METHOD OF IMPLEMENTING WIRELESS NEIGHBORHOOD AREA NETWORKS

(75) Inventor: Nader Mehravari, Ithaca, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/226,732

(22) Filed: Aug. 23, 2002

(65) Prior Publication Data

US 2003/0133413 A1    Jul. 17, 2003

Related U.S. Application Data

(60) Provisional application No. 60/347,553, filed on Jan. 11, 2002.

(51) Int. Cl.
  *H04L 12/26* (2006.01)
  *H04H 7/00* (2006.01)
(52) U.S. Cl. ............... 370/401; 725/126; 725/127; 455/426.1
(58) Field of Classification Search ............... 370/343, 370/352, 353, 354, 355, 356, 430, 480, 485, 370/486, 487, 490, 493, 494, 495; 455/3.01, 455/422, 554, 555; 725/62, 73, 78, 80, 81, 725/106
See application file for complete search history.

(56) References Cited

U.S. PATENT DOCUMENTS

| 5,410,343 | A | * | 4/1995 | Coddington et al. ........... 725/99 |
| 5,421,030 | A | * | 5/1995 | Baran ........................ 725/106 |
| 5,613,190 | A | * | 3/1997 | Hylton ....................... 725/81 |
| 5,708,961 | A | * | 1/1998 | Hylton et al. ................. 725/81 |
| 5,784,683 | A | * | 7/1998 | Sistanizadeh et al. ......... 725/73 |
| 5,798,902 | A | * | 8/1998 | Blodgett et al. ............ 361/149 |
| 5,943,604 | A | * | 8/1999 | Chen et al. ................. 370/248 |
| 6,188,912 | B1 |   | 2/2001 | Struhsaker et al. |
| 6,205,495 | B1 |   | 3/2001 | Gilbert et al. |

(Continued)

FOREIGN PATENT DOCUMENTS

WO    WO 97/48191    12/1997

(Continued)

OTHER PUBLICATIONS

Joelle Tessler; Mercury News; Ricochet returning to the Bay Area; Denver Telecom Firm is Gearing Up to Restore Service This Summer; Feb. 25, 2002; 5 pages; http://www.bayarea.com/mld/mercurynews/business/2741269.htm.

(Continued)

*Primary Examiner*—Andy Lee
(74) *Attorney, Agent, or Firm*—Michael Best & Friedrich, LLP (57) ABSTRACT

A communications system that receives information (e.g., TCP/IP-compatible audio, video, and data applications) from a high-speed wide-area network (e.g., an existing cable, DSL, or satellite network) and communicates at least a portion of the information to a wireless device. The information includes information having a first characteristic and information having a second characteristic. The system has at least one switch in communication with the network, where the switch is configured to receive the information and control the flow of the information based in part on the first and second characteristics. The system further includes an access point in communication with the at least one switch. The access point has a controller and an antenna, and is configured to receive at least a portion of the information from the network and to wirelessly transmit at least a portion of the received information to the wireless device.

33 Claims, 7 Drawing Sheets

U.S. PATENT DOCUMENTS

| | | | |
|---|---|---|---|
| 6,349,212 B1 * | 2/2002 | Martensson et al. | 455/462 |
| 6,400,816 B1 * | 6/2002 | Hjalmtysson et al. | 379/201.03 |
| 6,427,237 B1 * | 7/2002 | Aranguren et al. | 725/106 |
| 6,587,479 B1 * | 7/2003 | Bianchi et al. | 370/487 |
| 6,594,827 B1 * | 7/2003 | Pennings | 725/106 |

FOREIGN PATENT DOCUMENTS

| | | |
|---|---|---|
| WO | WO 00/52880 A2 | 9/2000 |
| WO | WO 00/52880 A3 | 9/2000 |
| WO | WO 01/09739 | 2/2001 |
| WO | WO 01/24134 | 4/2001 |
| WO | WO 01/33773 | 5/2001 |
| WO | WO 01/50706 | 7/2001 |

OTHER PUBLICATIONS

Ricochet High-Speed Wire-Free Internet; May 7, 2002; 2 pages; http://www.ricochet.com/.

What is Ricochet? May 7, 2002; 2 pages; http://www.ricochet.com/whatis.html.

* cited by examiner

| 230 | WIRELESS DEVICE |
| 500 | COMMUNICATIONS SYSTEM |
| 505 | SATELLITE INFRASTRUCTURE |
| 510 | PREMISES |
| 516 | DISH |
| 517 | SATELLITE |
| 518 | DISH |
| 519 | TRANSCEIVER |
| 530 | PREMISES |
| 535 | LAND |
| 538 | HOUSE |
| 540 | SWITCH |
| 545 | DEVICE |
| 550 | ACCESS POINT |
| 555 | HIGH SPEED MODEM |
| 560 | FIRST SWITCH |
| 570 | PROCESSOR |
| 575 | MEMORY |
| 580 | DEVICE |
| 585 | DEVICE |
| 600 | PROCESSOR |
| 605 | MEMORY |
| 610 | TRANSCEIVER |
| 615 | COMMUNICATIONS CIRCUITRY |
| 620 | ANTENNA |

SYSTEM FOR AND METHOD OF IMPLEMENTING WIRELESS NEIGHBORHOOD AREA NETWORKS

RELATED APPLICATIONS

This application claims the benefit of prior filed U.S. Provisional Patent Application No. 60/347,553, entitled SYSTEM FOR AND METHOD OF IMPLEMENTING WIRELESS NETWORKS, filed Jan. 11, 2002.

BACKGROUND OF THE INVENTION

The present invention relates to a system for and method of implementing wireless neighborhood area networks (wireless NAN or WNAN).

Wireless NANs are a type of "Packet-Switched Wireless Mobile Data Networks." Examples of prior packet-switched wireless mobile data networks are ARDIS (also known as DATATAC or Motient), MOBITEX, and Metricom's Ricochet. Wireless NANs are flexible packet switched networks whose geographical area of coverage could be designed to be anywhere from the coverage area of a wireless local area network (WLAN), to wireless metropolitan area networks (WMAN), to wireless wide area networks (WWAN).

Figure 6:
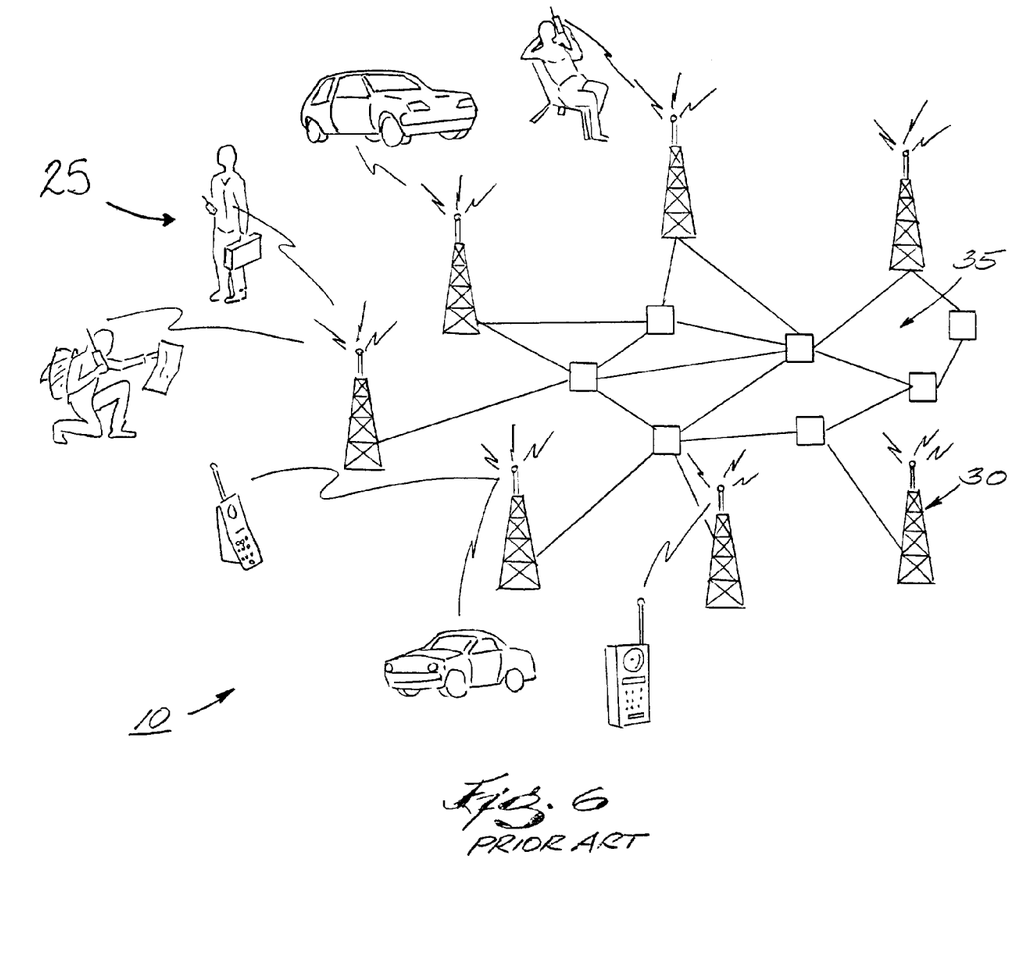
FIG. 6 is a schematic diagram representing a cellular telephony system of the prior art.

FIGS. 6 and 7 show the taxonomy of two prior art wireless networks 10 and 20. As depicted in FIGS. 6 and 7, typical wireless networks have three major components: 1) the end-users' wireless devices 25 (e.g., phone, pager, personal data assistant, laptop computers, handheld mobile computing devices, etc.), 2) collection of radio-frequency transceivers installed over a geographical area of coverage 30 (e.g., cellular telephone towers and base stations spread around town associated with a cellular telephony system as shown in FIG. 6; wireless access points installed within a building associated with a wireless local area network as shown in FIG. 7; etc.), and 3) the infrastructure interconnecting the collection of radio-frequency (RF) transceivers among themselves 35 (e.g., wire-line infrastructure interconnecting cellular base stations in FIG. 6 and wire-line data network interconnecting wireless access points in FIG. 7, etc.) and to other wire-line networks (e.g., the Internet, the public switched telephone network, etc.). For example, as depicted in FIG. 6, an existing wireless cellular telephony system 10 has cellular telephones that communicate with base stations via RF transceivers. The base stations communicate with other base stations and with other networks (e.g., the public switched telephone network) using fixed structure and wire-line interconnectivity. As a further example and as depicted in FIG. 7, wireless mobile computing devices in a wireless local area network environment communicate with wireless access points. The wireless access points in turn communicate with other access points and with other networks (e.g., the Internet) using fixed wireline infrastructure.

Implementation of affordable commercial high-speed (1 to 100 Mbps) wireless wide-area networks capable of supporting TCP/IP-compatible audio, video, and data applications has been hampered due to the high cost of the fixed infrastructure and the wireline components of such wireless wide area networks (i.e., the high cost of the 2nd and the 3rd components described above). For example, for a wireless mobile data system, the cost of establishing the wire-line infrastructure that supports high-speed communication with a plurality of wireless devices hampers the implementation of such high-speed networks. Consequently, known existing implementations of terrestrial wireless wide-area networks (including the three examples mentioned above) are not capable of supporting high-speed data services and are not capable of delivering an integrated set of audio, video, and data services to users.

There is an interest for an alternative and cost-effective method for implementing general-purpose high-speed (1 to 100 Mbps) wireless wide-area networks capable of supporting integrated voice, video and data services for mobile devices.

SUMMARY OF THE INVENTION

The invention includes novel systems and methods to implement high-speed wireless wide-area network services without the need for constructing expensive and dedicated new fixed structures and dedicated new wireline interconnectivity infrastructures (i.e., eliminating the high cost and the complexity of the 2nd and 3rd components of such networks as described above".) Almost all urban, suburban, and rural neighborhoods in the United States are served by one or more cable TV operators, local telephone companies, and/or satellite telecommunication service providers. In the case of the cable TV operators, the operators own and operate an extensive wireline infrastructure of high bandwidth coaxial or HFC (hybrid fiber-coaxial) infrastructure. In addition to delivering TV services, the existing cable TV infrastructure is capable of also delivering two-way high-speed data services to its subscribers. In the case of the local telephone companies, the companies own and operate an extensive wireline infrastructure of copper and fiber local loops. In addition to delivering telephony services, the existing local loop infrastructure is capable of also delivering two-way high-speed data services to its subscribers through a family of Digital Subscriber Line (DSL) technologies. And finally, in the case of satellite telecommunication service providers, the providers often own and operate an extensive satellite infrastructure. In addition to delivering TV services, the existing satellite infrastructure is capable of also delivering two-way high-speed data services to its subscribers.

In various embodiments, the systems and methods of the invention take advantage of the existing and extensive nationwide infrastructures to implement high-speed standards-based wireless networks in a wide-area geographical area. The invention uses, at least in part, the use of the existing infrastructures. In addition, it utilizes industry accepted national and international standards, supports high-speed (1 to 100 Mbps) connections, and provides integrated audio, video, and data services over the same network.

Accordingly, the invention provides a communications system located at a premises. The communication system receives information from a high-speed wide-area network and communicates at least a portion of the information to a wireless device. The information includes information having a first characteristic and information having a second characteristic. The system has at least one switch in communication with the network, where the at least one switch is configured to receive the information and control the flow of the information based in part on the first and second characteristics. The system further includes an access point in communication with the at least one switch. The access point has a controller and an antenna and is configured to receive at least a portion of the information from the network. The received information includes in part the second characteristic. The access point is further configured to wirelessly transmit at least a portion of the received information to the wireless device.

In another embodiment, the invention provides a communications system including an infrastructure configured to provide a high-speed wide-area network. The network is operable to transfer information having at least two characteristics. The system further includes, at a premises, at least one switch in communication with the network, where the at least one switch is configured to receive and control the flow of at least a portion of the transferred information based in part on the at least two characteristics. The system also includes a communications device in communication with the at least one switch. The communications device is configured to receive and communicate at least a portion of the transferred information having the first characteristic. The system further includes an access point in communication with the at least one switch. The access point has a controller and an antenna and is configured to receive and wirelessly transmit at least a portion of the transferred information having the second characteristic. The system also has a wireless device including an antenna and being configured to receive and interpret at least a portion of the wirelessly transmitted data from the access point.

In yet another embodiment the invention provides a method of controlling the flow of information from a wide-area network to a first communications device, a second communications device and a wireless device. The method includes, at a premises, receiving information from the wide-area network. The information has first, second, and third characteristics where each of the characteristics is different. The method further includes partitioning the information based in part on the first, second and third characteristics, transmitting at least a portion of the information having the first characteristic to the first communications device, transmitting at least a portion of the information having the second characteristic to the second communications device, and wirelessly transmitting at least a portion of the information having the third characteristic to the wireless device.

Other features of the invention will become apparent by consideration of the detailed description and accompanying drawings.

BRIEF DESCRIPTION OF THE DRAWINGS

FIG. 7 is a schematic diagram representing a wireless local area network of the prior art.

DETAILED DESCRIPTION

Before any embodiments of the invention are explained, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
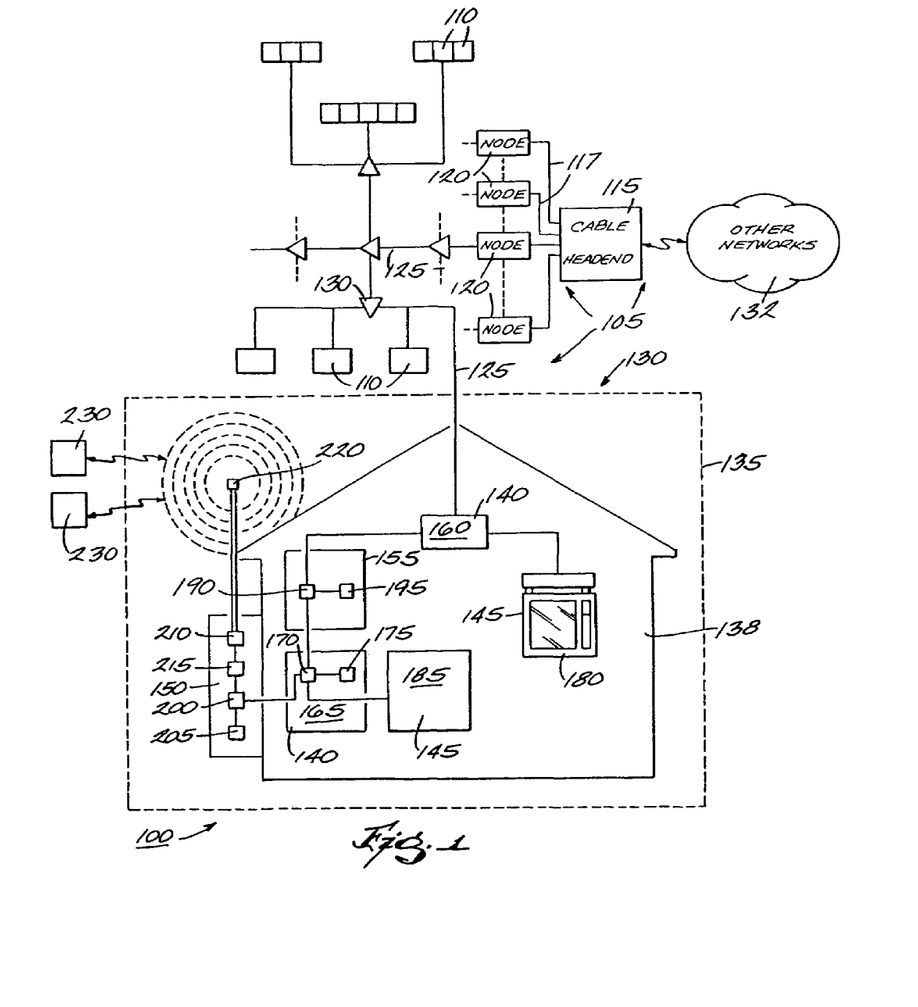
FIG. 1 is a schematic diagram representing a first communications system embodying the invention, where the system includes a cable-TV wire-line infrastructure operable to support a high-speed wide-area network.

One embodiment of a communications system 100 incorporating the invention is schematically shown in FIG. 1. For this embodiment, the system 100 generally includes an existing cable infrastructure 105, and a plurality of premises 110 connected to the cable infrastructure 105. The cable infrastructure 105 includes a cable headend 115 having the service provider's control center. The control center collects the information or material that is being delivered to the plurality of premises 110. The cable infrastructure 105 utilizes high bandwidth coaxial or hybrid fiber coaxial cables 117 to deliver information from the cable head ending 115 to a plurality of nodes 120. Each node 120 services a plurality (e.g., 500 to 2000) of premises 110 using coaxial cable 125. The cable infrastructure 105 may also include repeaters (e.g., repeater 130) for amplifying a weak signal.

In general, the cable infrastructure 105 supports a network that allows the service provider to deliver information to its subscribers. As used herein, the term "information" is broadly construed to comprise signals (e.g., television signals, telephone signals, analog signals, digital signals, etc.) and data (e.g., packet data, non-packet data, etc.). For example and for the embodiment shown in FIG. 1, the cable infrastructure 105 supports a network for delivering television service and two-way, high-speed data service to the plurality of premises 110. Additionally, the cable headend 115 is operable to communicate with other networks 132 (e.g., the Internet, public and private data networks, communications networks, etc.). The communication between the cable headend 115 and the other networks 132 may be via wire and/or wireless communications. An example of an existing cable operator that delivers television and high-speed data services is Time-Warner Cable, which provides ROAD RUNNER™ high speed online and cable television services.

Referring again to FIG. 1, the system 100 includes a plurality of premises 110 connected to the cable infrastructure 105. As used herein, the term "premises" refers to any parcel of land, including the building, home, office, or the like built on the parcel, that receives end services (e.g., television and data transfer services) from the service provider. An example premises 130 is shown in FIG. 1 having a parcel of land 135 and a residential house 138 built on the land 135.

The premises 130 generally includes at least one switch 140, at least one communications device 145 connected to the at least one switch 140, and an access point 150 connected to the at least one switch. As used herein, the term "connection," and variations thereof (e.g., connect, connected, connecting, etc.), includes direct and indirect connections. The premises 130 also generally includes an adapter 155 (commonly called a "cable modem").

The switch 140 receives information from the network and controllably transfers or transmits the information to the connected one or more communications devices 145 and the access point 150. Each switch 140 may be constructed with integrated and/or discrete circuit components, and may be analog and/or digital based. For example and as shown in FIG. 1, the first switch 160 is a circuit (e.g., a splitter) that separates television service from high-speed data service. That is, the first switch separates a first set of signals having a first frequency range or first characteristic associated with television service from a second set of signals having a second frequency range or second characteristic associated with high-speed data services. However, it should be noted that the invention is not limited to two frequency ranges. Any number of frequency ranges may be used with the invention.

Figure 2:
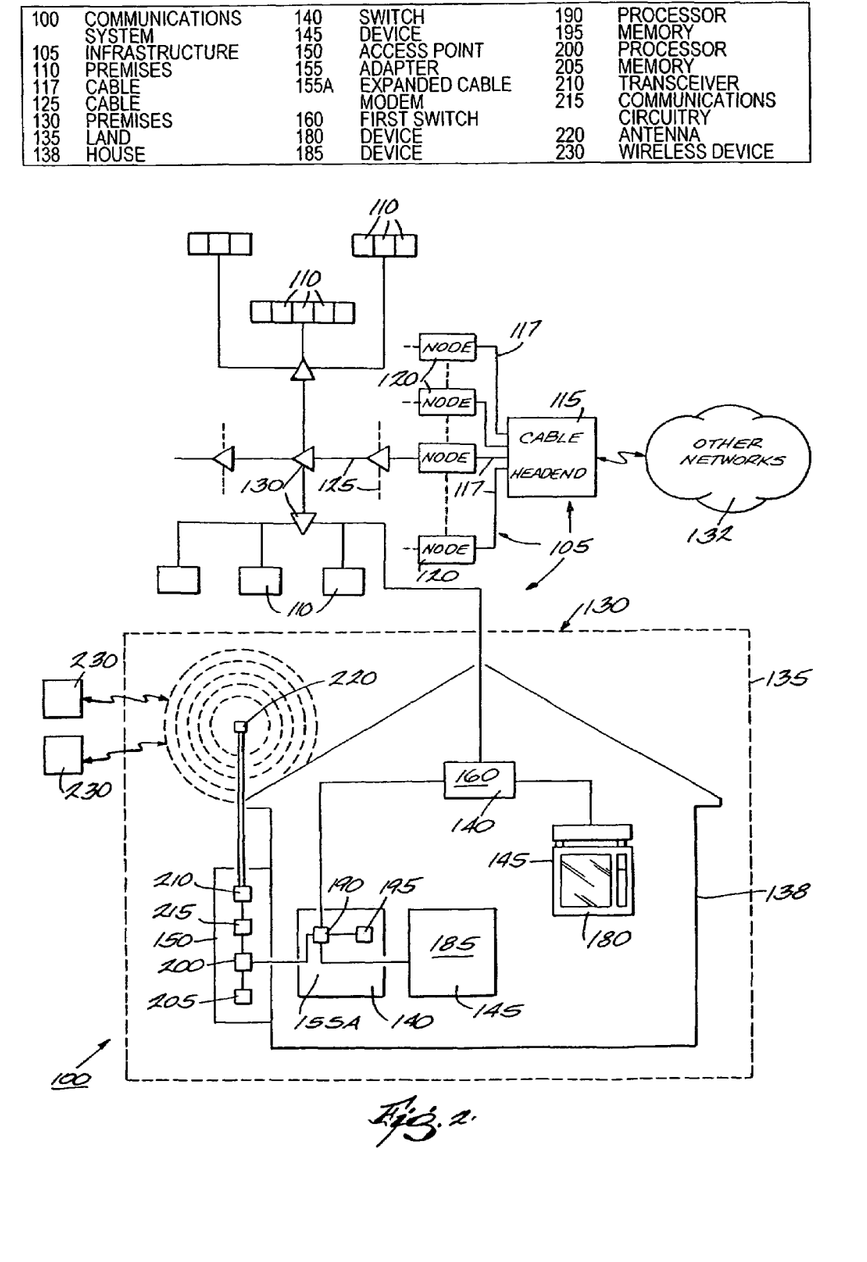
FIG. 2 is a partial schematic diagram representing a second communications system embodying the invention, where the system includes the cable infrastructure of FIG. 1.

The second switch 165 is a device that controllably transmits packet data based on the address of the data packets. For the embodiment shown, the second switch includes a processor 170 and a memory 175. The memory 175 includes one or more software modules having instructions, and the processor 170 retrieves, interprets and executes the instructions to control the second switch 165 to issue, learn, store and recognize large numbers of addresses for end devices (e.g., the second communications device and the wireless devices, discussed below). Based on the stored addresses, the second switch 165 controls the flow of data to and from the attached end devices. Examples of switches capable of being used as the second switch for the invention include a router, a hub, or similar devices. It is also envisioned that the one or more operations of the one or more switches 140 may be incorporated within other elements located at the premises 130. For example and as shown in FIG. 2, the second switch is incorporated within an "expanded" cable modem 155A. For another example, one or more operations of the second switch 165 may be performed by the access point 150. Other example arrangements for the one or more switches 140 are described in connection with the embodiments shown in FIGS. 3 and 4. It should also be noted that, while FIGS. 1–4 are described in connection with the one or more switches 140 controlling the flow of information based on a frequency range of the received signals and/or an address of the received data, other characteristics (e.g., codes or states) may be used. Additionally and in some embodiments, the lack of a distinguishing characteristic is used as a characteristic (e.g., separating data having a lead code from data having no lead code, or separating packet data from non-packet data).

The one or more communications devices 145 receive, either directly or indirectly, information from the cable network via the one or more switches 140, and interpret the received information. For example and as shown in FIG. 1, the one or more communications devices 145 include first and second communications devices 180 and 185.

The first communications device 180 receives television services from the first switch 160 and communicates the television programming to a user. Example first communications devices 180 include a cable box, an analog or digital television, etc. As will become more apparent below, for other embodiments, the first communications device 180 may be any communications device (e.g., telephone, facsimile machine, etc.) that is operable to interpret and communicate information that does not include packet data.

The second communications device 185 receives high-speed data services from the second switch 165 and interprets the received data. Example second communications devices 185 include a computer, an Internet appliance, a personal data assistant, a handheld device, and similar devices. As used herein, a "computer" is an electronic device that accepts and processes information according to instructions; an "Internet appliance" is a device designed for accessing the World Wide Web; a "handheld device" is a device (e.g., a computer) small enough to hold in one hand and operate with the other; and a "personal data assistant" is a handheld computer that service as an organizer for personal information.

The high-speed data services include information having data. For the embodiments shown in FIGS. 1–4, the data includes packet data (e.g., TCP/IP data). The data received at the second communications device 185 may be directly from the second switch (e.g., via an Ethernet connection) or from the expanded cable modem 155A (FIG. 2), which includes the second switch.

The adapter 155 connects the second communications device 185 and the access point 150 to the cable infrastructure 105 such that the second communications device 185 and the access point 150 can receive high-speed data services from the cable network. For the embodiment shown, the cable modem 155 includes a processor 190 and a memory 195. The memory 195 includes one or more software modules having instructions, and the processor 190 retrieves, interprets and executes the instructions to control the cable modem 155. Of course, the cable modem 155 may include other circuitry as is known in the art. Also, one skilled in the art will realize that the operations of the second switch 165 and one or more operations of the access point 150 (discussed below) may be incorporated within the cable modem 155 or vice versa.

As shown in FIG. 1, the premises 130 further includes an access point 150. The access point 150 includes a processor 200, a memory 205, and a radio-frequency (RF) system. The memory 205 includes one or more software modules having instructions, and the processor 200 retrieves, interprets, and executes the instructions of the one or more software modules to control the access point 150. The RF system includes a receiver, a transmitter (collectively shown as transceiver 210), communications circuitry 215 (e.g., filters, amplifiers, etc.), and antenna 220. The RF system sends and receives RF communications to and from a plurality of wireless devices 230. The antenna 220 is mounted on a tower or mast, or on a rooftop or other structure, and radiates and receives communications signals. The range of the radiation pattern depends on the type of the radiation pattern (e.g., an omni-directional radiation pattern, a directional radiation pattern, etc.) and the amount of power transmitted by the antenna 220. The access point 150 communicates with wireless devices 230 using the IEEE 802.11 protocol as is known in the art. However, other protocols may be used with the invention. An example access point 150 capable of being used with the invention is a Symbol Technologies, Spectrum24 Ethernet Access Point, part number AP-3020-500-US.

Similar to the one or more switches 140 and the cable modem 155, one or more operations of the access point 150 may be incorporated with other components at the premises 130. The modification of the one or more switches 140, the cable modem 155 and the access point 150 is possible since each device includes circuitry where the location of the circuitry and one or more operations performed by the circuitry is not dependent upon the location of the circuitry at the premises 130.

Referring again to FIG. 1, the access point 150 wirelessly communicates with a plurality of wireless devices 230. As used herein, a "wireless device" is any electronic device having a wireless network interface that allows for wireless communications. Example wireless devices includes, but is not limited to, wireless phones, pagers, wireless PDAs, wireless computers (e.g., laptop and portable computers), wireless handheld devices, wireless Internet appliances, etc.

Figure 5:
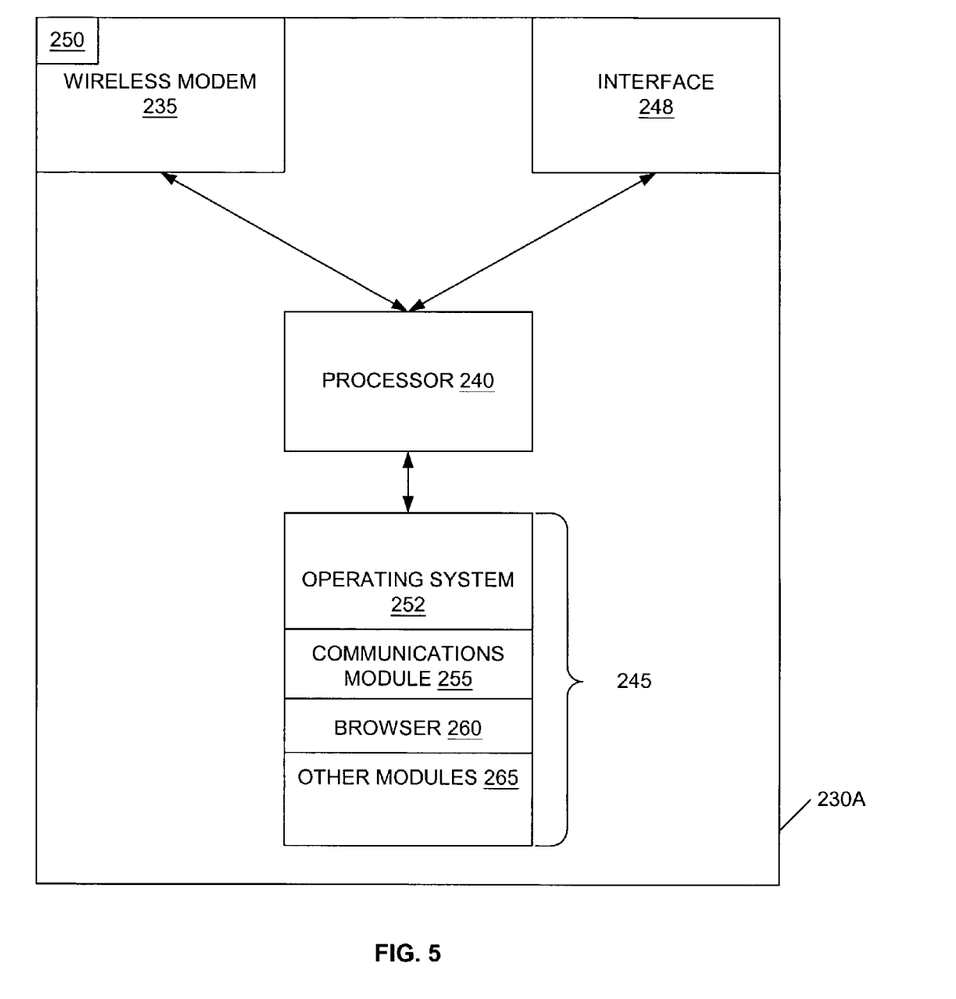
FIG. 5 is a schematic diagram representing an exemplary wireless device capable of being used with the communication systems of FIGS. 1–4.

An exemplary wireless device 230A is schematically shown in FIG. 5. With reference to FIG. 5, the wireless device 230A includes a wireless adapter or modem 235, a processor 240, a memory 245, and an interface 248. The wireless modem 235 includes an antenna 250 that enables the wireless device 230A to wirelessly communicate with the access point 150 using the IEEE 802.11 protocol as is known in the art. The communication with the access point 150 includes the modem 235 receiving high-speed information from the access point 150. Example communicated information includes TCP/IP-compatible audio, video, and data applications. The wireless modem 235 provides the information to the processor 240 via an Ethernet or network connection.

The memory 245 includes one or more software modules having instructions, and the processor 240 retrieves, interprets, and executes the instructions of the one or more software modules to control the wireless device 230A. Example software modules include an operating system 252, a communications module 255, and a browser 260. The operating system 252 provides a platform allowing the wireless device 230A to operate, the communications module allows the processor 240 to communicate with the wireless modem 235 for transmitting and receiving information, and the browser 260 provides a tool that is capable of accessing the World Wide Web or other distributed network. Of course, the memory 245 can include other modules, and the wireless device 230A can download additional modules. Example modules include modules for allowing the wireless device 230A to receive TCP/IP-compatible audio, video, and data communications, to communicate with other portions of the Internet, and to communicate with private networks.

The interface 248 includes one or more input devices and one or more output devices. The interface 248 allows an operation to interact with the wireless device 230A. While an exemplary wireless device 230A is shown and described, other wireless devices 230 may be used with the invention.

Figure 3:
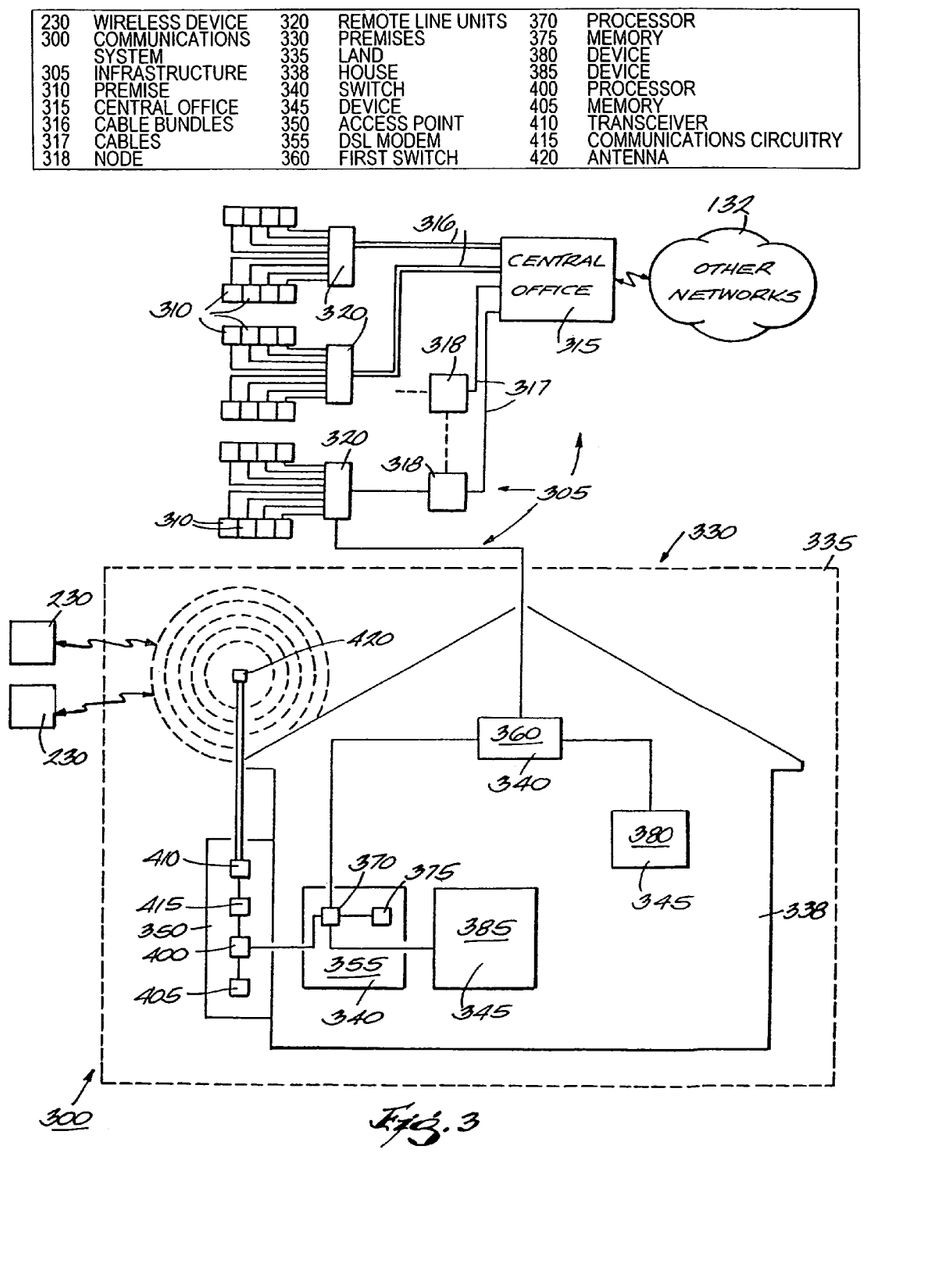
FIG. 3 is a schematic diagram representing a third communications system embodying the invention, where the system includes a DSL wire-line infrastructure configured to support a high-speed wide-area network.

A third embodiment of a communications system 300 incorporating the invention is schematically shown in FIG. 3. For this embodiment, the system 300 generally includes an existing wire-line infrastructure 305 for a telephone system, and a plurality of premises 310 connected to the wire-line infrastructure 305. The wire-line infrastructure 305 includes a central office 315 having the service provider's control center and a digital switch. The control center collects the information or material that is being delivered to the plurality of premises 310. The wire-line infrastructure 305 utilizes cable bundles 316 carrying thousands of copper pairs and/or fiber-optic cables 317 (including nodes 318 having repeaters) to deliver information from the central office 315 to a plurality of remote line units 320. Each unit 320 services a plurality (e.g., 100) of premises 310 using copper pairs.

In general, the wire-line infrastructure 305 supports a network that allows the service provider to deliver information to its subscribers. For example and for the embodiment shown in FIG. 3, the wire-line infrastructure 315 supports a network for delivering telephone service and two-way, high-speed data service to the plurality of premises 310. Additionally, the central office 315 is operable to communicate with other networks 132 (e.g., the Internet, public and private data networks, communications networks, etc.). The communication between the central office 315 and the other networks 132 may be via wire and/or wireless communications. An example of an existing telephone service provider that delivers telephone and high-speed data services is SBC-Ameritech of Chicago, Ill.

Referring again to FIG. 3, the system 300 includes a plurality of premises 310 connected to the wire-line infrastructure 305. As was stated above, the term "premises" refers to any parcel of land, including the building, home, office, or the like built on the parcel, that receives end services (e.g., telephone and data transfer services) from the service provider. Example premises 330 is schematically shown in FIG. 3, which includes a parcel of land 335 and a residential house 338 built on the land 335.

The premises 330 generally includes at least one switch 340, at least one communications device 345 connected to the at least one switch 340, and an access point 350 connected to the at least one switch 340. The premises 130 also generally includes a digital subscriber line (DSL) adapter (commonly called a "DSL modem"). For FIG. 3, the DSL modem is an "expanded" DSL modem 355 including one or more software modules (discussed below) that perform the operations of one of the switches 340.

The switch 340 receives information from the network and controllably transfers or transmits the information to the connected one or more communications devices 345 and the access point 350. Similar to switch 140, each switch 340 may be constructed with integrated and/or discrete circuit components, and may be analog and/or digital based. For example and as shown in FIG. 3, a first switch 360 is a circuit (e.g., a splitter) that separates telephone service from high-speed data service. That is, the first switch 360 separates a first set of signals having a first frequency range associated with telephone service from a second set of signals having a second frequency range associated with high-speed data services.

A second switch, which, for FIG. 3, is incorporated with the expanded DSL modem 355, controllably transmits packet data based on the address of the data packets. The expanded DSL modem 355 includes a processor 370 and a memory 375. The memory 375 includes one or more software modules having instructions, and the processor 370 retrieves, interprets and executes the instructions of the one or more software modules to control the expanded DSL modem 355 to issue, learn, store and recognize a large number of addresses for connected end devices (e.g., for the second communications device and the wireless devices). Based on the stored addresses, the second switch controls the flow of data to and from the attached end devices. The expanded DSL modem 355 also connects the second communications device (discussed below) and the access point 350 to the wire-line infrastructure 305 such that the second communications device and the access point 350 can receive high-speed data services from a DSL network. As was discussed above in connection with FIG. 1, one skilled in the art will realize that the operations of the second switch 365 and the functions of the DSL modem 370 may be implemented in more than one device. Similarly, one or more operations of the access point (discussed below) may be incorporated within the expanded DSL modem 365. Other variations are possible depending on the arrangement of components at the premises 330.

The one or more communications devices 345 receive information from the telephone/DSL network via the one or more switches 340, and interpret the received information. For example and as shown in FIG. 3, the one or more communications devices 345 include first and second communications devices 380 and 385.

The first communications device 380 receives telephone services from the first switch 360 and communicates the services to a user. Additionally, the first communications device 380 receives information from a user (e.g., voice communication, information via a facsimile machine, etc.) and communicates that information to the telephone/DSL network via the first switch 360. Example first communications devices 345 include a telephone, a facsimile machine and similar devices.

The second communications device 385 receives high-speed data services from the expanded DSL modem 355 and interprets the received data. Similar to the embodiment for FIG. 1, example second communications devices 385 include a computer, an internet appliance, a personal data assistant, and similar devices. The high-speed data services include information having packet data (e.g., TCP/IP data).

Referring again to FIG. 3, the premises 330 further includes an access point 350. Similar to above, the access point 350 includes a processor 400, a memory 405, and an RF system. The memory 405 includes one or more software modules having instructions, and the processor 400 retrieves, interprets and executes the instructions of the one or more software modules to control the access point 350. The RF system includes a receiver, a transmitter (collectively shown as transceiver 410), communications circuitry 415 (e.g., filters, amplifiers, etc.), and antenna 420. The antenna 420 is mounted on a tower or mast, or on a rooftop or other structure, and radiates and receives RF signals to and from the wireless devices 230. The range of the radiation pattern depends on the type of the radiation pattern (e.g., an omni-directional radiation pattern, a directional radiation pattern, etc.) and the amount of power transmitted by the antenna 420. The access point 350 communicates with the wireless devices 230 using the IEEE 802.11 protocol as is known in the art. However, other protocols may be used with the invention. Additionally, similar to the one or more switches 340 and the expanded DSL modem 355, one or more operations of the access point 350 may be incorporated with other components at the premises 330.

The access point 350 wirelessly communicates with a plurality of wireless devices 230. As was discussed above, the wireless device 230 is any electronic device having a wireless network interface that allows for wireless communications.

Figure 4:
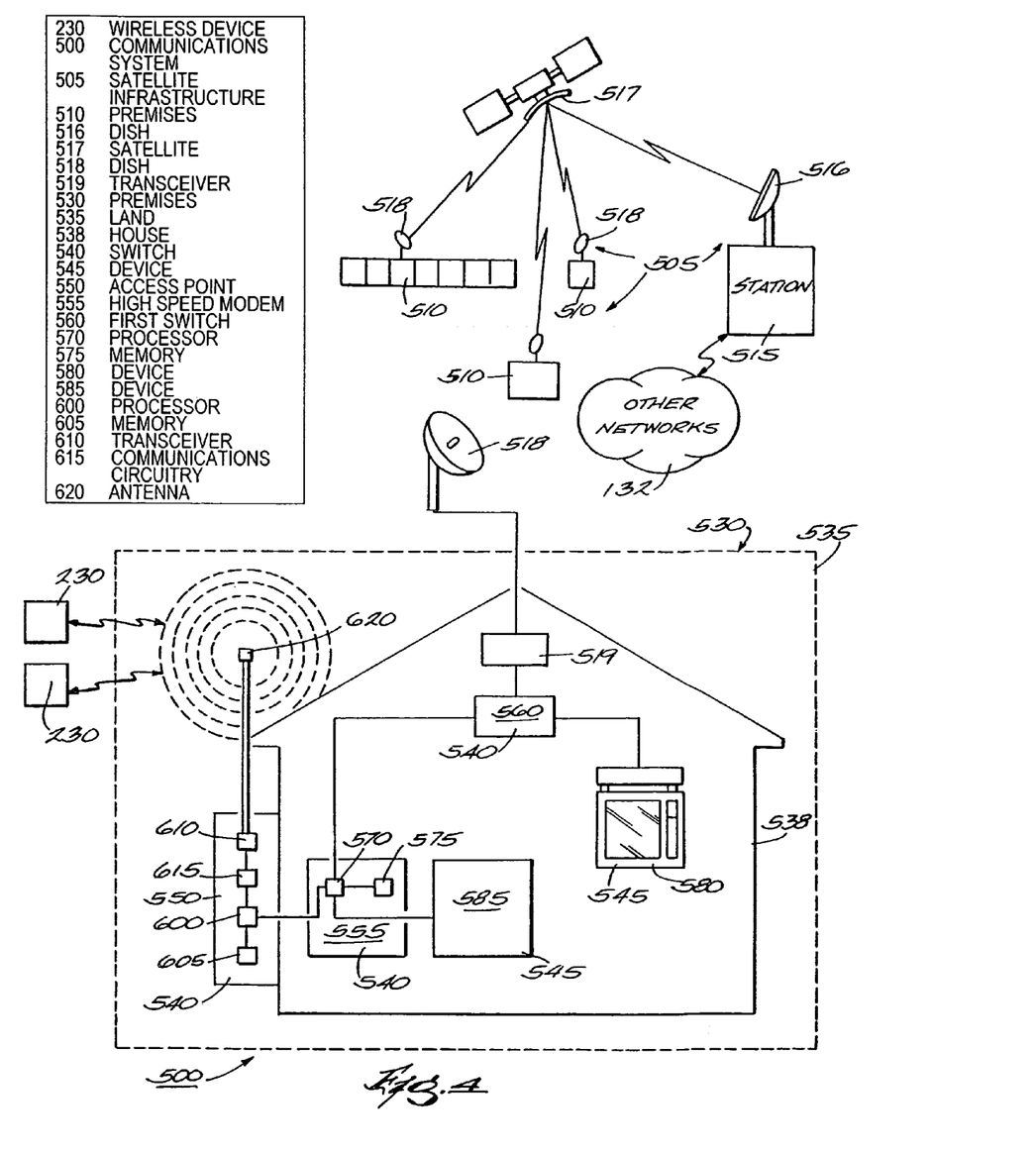
FIG. 4 is a schematic diagram representing a fourth communications system embodying the invention, where the system includes a satellite infrastructure configured to support a high-speed wide-area network.

A fourth embodiment of a communications system 500 incorporating the invention is schematically shown in FIG. 4. For this embodiment, the system 500 generally includes an existing satellite infrastructure 505 (e.g., a satellite TV infrastructure), and a plurality of premises 510 connected to the satellite infrastructure 505. The satellite infrastructure 505 includes an earth station 515 having the service provider's control center. The control center collects the information or material that is being delivered to the plurality of premises 510. The satellite infrastructure 505 utilizes one or more satellite transmitters or dishes (e.g., dish 516) at the earth station 515 for communicating information to one or more satellites (e.g., satellite 517). The satellite 517 relays the information to one or more satellite receivers or dishes 518 located at the plurality of premises 510. Each satellite dish 518 connects to a satellite transceiver 519.

In general, the satellite infrastructure 505 supports a network that allows the service provider to deliver information to its subscribers. For example and for the embodiment shown in FIG. 4, the satellite infrastructure 505 supports a network for delivering two-way, high-speed data service to the plurality of premises 510. The network may provide other services such as television services, and the earth station 515 is operable to communicate with other networks 132 (e.g., the Internet, public and private data networks, communications networks, etc.). The communication between the earth station 515 and the other networks 132 may be via wire and/or wireless communications. An example of an existing service provider that delivers high-speed data services via a satellite infrastructure is Hughes Network Systems of Germantown, Md., which offers DIRECTWAY™ service.

Referring again to FIG. 4, the system 500 includes a plurality of premises 510 connected to the satellite infrastructure 505. As was stated above, the term "premises" refers to any parcel of land, including the building, home, office, or the like built on the parcel, that receives end services (e.g., television, data transfer services, etc.) from the service provider. An example premises 530, including a parcel of land 535 and a residential house 538 built on the land 535, is schematically shown in FIG. 4.

The premises 530 generally includes at least one switch 540, at least one communications device 545 connected to the at least one switch 540, and an access point 550 connected to the at least one switch 540. The premises 530 also generally includes an adapter or high-speed modem. For FIG. 4, the high-speed modem is an "expanded" high speed modem 555 including one or more software modules (discussed below) that perform the operations of a switch. Additionally, the access point 550 also includes one or more software modules that perform the operations of a switch.

The switch 540 receives information from the network and controllably transfers or transmits the information to the connected one or more communications devices 545 and the wireless devices 230. Similar to switches 140 and 340, each switch 540 may be constructed with integrated and/or discrete circuit components, and may be analog and/or digital based. For example and as shown in FIG. 4, a first switch 560 is a device (e.g., a splitter) that separates television programming from high-speed data service. The first switch 560 separates a first set of signals having a first frequency range associated with television services from a second set of signals having a second frequency range associated with high-speed data services.

A second switch, which, for FIG. 4, is incorporated with the expanded high-speed modem 555, controllably transmits packet data to a connected first communications device (discussed below) when the address of the data packet matches the address associated with the first communications device. The expanded high-speed modem 555 includes a processor 570 and a memory 575. The memory 575 includes one or more software modules having instructions, and the processor 370 retrieves, interprets and executes the instructions of the one or more software modules to control the expanded high-speed modem 555 for transferring packet data to the first communications device.

A third switch, which for FIG. 4 is incorporated with the access point 550, controls the flow of data to and from the attached wireless end devices. As was discussed above in connection with FIG. 1, one skilled in the art will realize that other variations of the first, second and third switches are possible depending on the arrangement of components at the premises 530.

The one or more communications devices 545 receive information from the satellite network via the one or more switches 540, and interpret the received information. For example and as shown in FIG. 4, the one or more communications devices include first and second communications devices 580 and 585.

The first communications device 580 receives television services from the first switch 560 and communicates the television services to a user. Example first communications devices 580 include a set-top box or receiver, an analog or digital television, etc. The second communications device 585 receives high-speed data services from the expanded high-speed modem 555 and interprets the received data. Similar to the embodiment for FIG. 1, example second communications devices 585 include a computer, an internet appliance, a personal data assistant, etc.

Referring again to FIG. 4, the premises 530 further includes an access point 550. The access point 550 includes a processor 600, a memory 605, and an RF system. The memory 605 includes one or more software modules having instructions, and the processor 600 retrieves, interprets and executes the instructions of the one or more software modules to control the access point 550. As was discussed above, the access point also includes the third switch. The third switch is in the form of one or more software modules having instructions, where the processor 600 retrieves, interprets and executes the instructions of the one or more software modules to control the third switch to issue, learn, store and recognize large numbers of addresses for end devices, and to control the flow of information transmitted by the access point based on the stored addresses.

The RF system includes a receiver, a transmitter (collectively shown as transceiver 610), communications circuitry 615 (e.g., filters, amplifiers, etc.), and antenna 620. The RF system sends and receives RF communications. The antenna 620 is mounted on a tower or mast, or on a rooftop or other structure, and radiates and receives communications signals to and from the wireless devices 230. The access point 550 communicates with the wireless devices 230 using the IEEE 802.11 protocol as is known in the art. However, other protocols may be used with the invention. Additionally, similar to FIGS. 1–3, the wireless devices are any electronic device having a wireless network interface card that allows for wireless communications.

Because the invention uses existing infrastructure (e.g., DSL, cable, or satellite systems), a new wire-line infrastructure is not required. This dramatically reduces the cost of creating a high-speed wireless wide-area or neighborhood system capable of supporting information transfers such as TCP/IP-compatible audio, video, and data applications. The existing infrastructures discussed above allow for greater transfer rates of data than existing wireless mobile data systems. Further, allowing for greater transfer rates, removes the requirement of massaging, processing or storing data as required by some existing wireless systems.

In operation, information is provided to the plurality of premises 130, 330 or 530 via the infrastructures 105, 305 or 505 as is well known in the art. At the premises, the one or more switches 140, 340 or 540 control the flow of information to the one or more communications devices 145, 345 or 545 and to the access point 150, 350 or 550. Additionally, the modem 165, 365 or 565 processes signals received by the modem 165, 365 or 565.

For example and as shown in FIG. 1, the first switch 160 separates signals having a first frequency range from signals having a second frequency range. The signals of the first frequency range, which include non-packet data, is provided to the first communications device 180. The signals of the second frequency range are provided to the cable modem 155. The cable modem 155 processes the signals of the second frequency range, which include packet data, and provides the data to the second switch 165. The second switch 165 analyzes the addresses for each data packet and controls the flow of the packets according to the addresses. Specifically, the second switch 165 learns an address for the second communications device 185 and transmits all the packets to the device 185 that match that address. Additionally, the second switch 165 issues, learns and stores addresses of the wireless devices 230 connected to the second switch via the access point 220. The second switch 165 transmits all the data packets received by the switch 165 that match the address of the wireless devices 230 connected to the access point 150.

For the embodiment shown in FIG. 2, the first switch 160 separates signals having a first frequency range from signals having a second frequency range. The signals of the first frequency range, which include non-packet data, is transmitted to the first communications device 180. The signals of the second frequency range are provided to the expanded cable modem 155A. The expanded cable modem 155A processes the signals of the second frequency range, which include packet data. The expanded cable modem 155A, which also includes one or more software modules that perform the function of a second switch, analyzes the addresses for each data packet and controls the flow of the packets according to the addresses. Specifically, the expanded cable modem 155A learns an address for the second communications device 185 and transmits all the packets to the device 185 that match that address. Additionally, the expanded cable modem 155A issues, learns and stores addresses of the wireless devices 230 connected to the expanded cable modem via the access point 220. The expanded cable modem 155A transmits all the data packets received by the modem 155A that match the addresses of the wireless devices 220 connected to the access point 150. The first switch 360 and the expanded DSL modem 355 of the embodiment shown in FIG. 3 perform similarly to the embodiment just described for FIG. 2.

For the embodiment shown in FIG. 4, the first switch 560 separates signals having a first frequency range from signals having a second frequency range. The signals of the first frequency range, which include non-packet data, is transmitted to the first communications device 580. The signals of the second frequency range are provided to the expanded high-speed modem 555. The expanded high-speed modem 555 processes the signals of the second frequency range, which include packet data. The expanded high-speed modem 555, which also includes one or more software modules that perform the function of a second switch, analyzes the addresses for each data packet and controls the flow of the packets according to the addresses. Specifically, the expanded high-speed modem 555 learns an address for the second communications device 585 and transmits all the packets to the device 585 that match that address. All other packets not matching the address for the second communications device are transmitted to the access point 550. The access point 550, which includes software modules that are executed by the processor, issues, learns and stores addresses of the wireless devices 230 connected to the access point 550. The access point 550 transmits all the data packets received by the access point 550 that match the addresses of the wireless devices 230 connected to the access point 550. In a variation of the embodiment shown in FIG. 4, the access point may transmit all the data packets received. The transmission of the packet data may be by performed by any known communications scheme that transmits signals including packet data to a plurality of connected wireless devices 230. For example, the packets may be communicated to the wireless devices 230 using an IEEE 802.11 standard.

Thus, the invention provides, among other things, new and useful systems for and methods of implementing wireless neighborhood area networks. As shown above, the systems and methods do not require dedicated, unique, or proprietary fixed wireline infrastructures. Instead, it uses at least in part existing infrastructures. In addition, it can utilize industry accepted national and international standards, supports high-speed (1 to 100 Mbps) connections, and provides integrated audio, video, and data services over the same network. Various features and advantages of the invention are set forth in the following claims.

What is claimed is:

1. A communications system located at a premises and utilized with a high-speed wide-area network to promote high-speed communication between the high-speed wide-area network and a plurality of mobile wireless devices, the high-speed wide-area network providing at least information having a first characteristic and information having a second characteristic, the system comprising
   at least one switch in communication with the high-speed wide-area network, the at least one switch being configured to receive information from the high-speed wide-area network and control the flow of the information based at least in part on the first and second characteristics;
   an access point in communication with the at least one switch, the access point including a controller and an antenna and being configured to
      receive at least a portion of the information from the at least one switch, the received information having in part the second characteristic,
      wirelessly transmit at least a portion of the received information to the plurality of mobile wireless devices, and
      wirelessly receive further information from the plurality of mobile wireless devices and transmit at least a portion of the wirelessly received information to the high-speed wide-area network;
   wherein the information wirelessly communicated to and from the access point and the plurality of mobile wireless devices supports at least one of audio and video; and
   wherein the access point implements a wireless wide-area network with the plurality of mobile wireless devices.

2. A communications system as set forth in claim 1 wherein the first and second characteristics include first and second frequency ranges, respectively,
   wherein the information from the high-speed wide-area network includes a first set of signals having the first frequency range and a second set of signals having the second frequency range,
   wherein the at least one switch is further configured to control the flow of the received information based at least in part on the first and second frequency ranges, and
   wherein the access point is further configured to receive at least a portion of the second set of signals having the second frequency range.

3. A communications system as set forth in claim 2 and further comprising:
   a communications device in communication with the at least one switch, the communications device being configured to
      receive at least a portion of the first set of signals having the first frequency range, and
      communicate at least a portion of the received first set of signals.

4. A communications device as set forth in claim 3 wherein the first set of signals include a signal selected from the group consisting of a television signal and a telephone signal.

5. A communication system as set forth in claim 1 wherein at least some of the plurality of mobile wireless devices are located off the premises.

6. A communication system as set forth in claim 1 wherein the information communicated to and from the access point and the plurality of mobile wireless devices supports at least two of audio, video, and high speed data services.

7. A communication system as set forth in claim 1 wherein the wireless wide-area network includes a metropolitan-area network.

8. A communications system located at a premises and utilized with a high-speed wide-area network to promote high-speed communication between the high-speed wide-area network and a plurality of mobile wireless devices, the high-speed wide-area network providing at least information having a first characteristic and information having a second characteristic, the system comprising
   at least one switch in communication with the high-speed wide-area network, the at least one switch being configured to receive information from the high-speed wide-area network and control the flow of the information based at least in part on the first and second characteristics;
   an access point in communication with the at least one switch, the access point including a controller and an antenna and being configured to
      receive at least a portion of the information from the at least one switch, the received information having in part the second characteristic,
      wirelessly transmit at least a portion of the received information to the plurality of mobile wireless devices, and
      wirelessly receive further information from the plurality of mobile wireless devices and transmit at least a portion of the wirelessly received information to the high-speed wide-area network;
   wherein the information wirelessly communicated to and from the access point and the plurality of mobile wireless devices supports at least one of audio and video;
   wherein the access point implements a wireless wide-area network with the plurality of mobile wireless devices
   wherein the first and second characteristics include first and second codes, respectively;
   wherein the information from the high-speed wide-area network includes information having the first code and information having the second code,
   wherein the at least one switch is further configured to control the flow of the received information based at least in part on the first and second codes, and
   wherein the access point is further configured to receive at least a portion of the information having the second code.

9. A communications system as set forth in claim 8 and further comprising:
   a communications device in communication with the at least one switch, the communications device being configured to receive at least a portion of the information having the first code, and communicate at least a portion of the received information having the first code.

10. A communications system as set forth in claim 9 wherein the communications device is selected from the group consisting of a computer, a handheld device, a personal-data assistant, and an internet appliance.

11. A communications system as set forth in claim 8 wherein the information from the high-speed wide-area network includes a first set of signals having a first frequency range and a second set of signals having a second frequency range, wherein the at least one switch is further configured to control the flow of the received information further based on the first and second frequency ranges, and wherein the access point is further configured to receive at least a portion of the second set of signals having the second frequency range.

12. A communications system located at a premises and utilized with a high-speed wide-area network to promote high-speed communication between the high-speed wide-area network and a plurality of mobile wireless devices, the high-speed wide-area network providing at least information having a first characteristic and information having a second characteristic, the system comprising at least one switch in communication with the high-speed wide-area network, the at least one switch being configured to receive information from the high-speed wide-area network and control the flow of the information based at least in part on the first and second characteristics;

an access point in communication with the at least one switch, the access point including a controller and an antenna and being configured to receive at least a portion of the information from the at least one switch, the received information having in part the second characteristic, wirelessly transmit at least a portion of the received information to the plurality of mobile wireless devices, and wirelessly receive further information from the plurality of mobile wireless devices and transmit at least a portion of the wirelessly received information to the high-speed wide-area network;

wherein the information wirelessly communicated to and from the access point and the plurality of mobile wireless devices supports at least one of audio and video;

wherein the access point implements a wireless wide-area network with the plurality of mobile wireless devices wherein the information includes packet data, wherein the first and second characteristics include first and second addresses, respectively, wherein the information from the high-speed wide-area network includes data packets having the first address and data packets having the second address, and wherein the at least one switch is further configured to control the flow of the received information based at least in part on the first and second addresses, and wherein the access point is further configured to receive at least a portion of the data packets having the second address.

13. A communications system as set forth in claim 12 and further comprising:

a communications device in communication with the at least one switch, the communications device being configured to receive at least a portion of the data packets having the first address, and communicate at least a portion of the received data packets having the first address.

14. A communications system as set forth in claim 13 wherein the communications device is selected from the group consisting of a personal computer, a handheld device, a personal-data assistant, and an internet appliance.

15. A communications system as set forth in claim 12 wherein the information from the high-speed wide-area network includes a first set of signals having a first frequency range and a second set of signals having a second frequency range, wherein the at least one switch is further configured to control the flow of the received information further based on the first and second frequency ranges, and wherein the access point is further configured to receive at least a portion of the second set of signals having the second frequency range.

16. A communications system comprising:

a general-purpose infrastructure configured to provide a high-speed wide-area network, the network being operable to transfer information having at least two characteristics;

at a premises, at least one switch in communication with the high-speed wide-area network, the at least one switch being configured to receive and control the flow of at least a portion of the transferred information based at least in part on the at least two characteristics, a communications device in communication with the at least one switch, the communications device being configured to receive and communicate at least a portion of the transferred information having the first characteristic, an access point in communication with the at least one switch, the access point including a controller and an antenna and being configured to receive and wirelessly transmit at least a portion of the transferred information having the second characteristic;

a plurality of mobile wireless devices including an antenna, and being configured to receive and interpret at least a portion of the wirelessly transmitted information from the access point and wirelessly transmit further information to the access point;

wherein the information wirelessly communicated to and from the access point and the plurality of mobile wireless devices supports at least one of audio and video; and wherein the access point implements a wireless wide-area network with the plurality of mobile wireless devices.

17. A communications system as set forth in claim 16 wherein the information includes information having a first code and information having a second code, wherein the at least one switch is further configured to control the flow of the received information based at least in part on the first and second codes, wherein the first communications device is further configured to receive at least a portion of the information having the first code, and wherein the access point is further configured to receive at least a portion of the information having the second code.

18. A communications system as set forth in claim 16 wherein the information includes a first set of signals having a first frequency range and a second set of signals having a second frequency range,
   wherein the at least one switch is further configured to control the flow of the received information based at least in part on the first and second frequency ranges,
   wherein the first communications device is further configured to receive at least a portion of the first set of signals having the first frequency range, and
   wherein the access point is further configured to receive at least a portion of the second set of signals having the second frequency range.

19. A communications system as set forth in claim 16 wherein the information includes data packets having a first address and data packets having a second address,
   wherein the at least one switch is further configured to control the flow of the received information based at least in part on the first and second addresses,
   wherein the first communications device is further configured to receive at least a portion of the data packets having the first address, and
   wherein the access point is further configured to receive at least a portion of the data packets having the second address.

20. A communications system as set forth in claim 16 wherein the information includes a first set of signals having a first frequency range and a second set of signals having a second frequency range,
   wherein the second set of signals include data packets having a first address and data packets having a second address,
   wherein the communications device is a first communications device,
   wherein the communications system further comprises a second communications device,
   wherein the at least one switch is further configured to control the flow of the received information based in part on the first and second frequency ranges and based in part on the first and second addresses,
   wherein the first communications device is further configured to receive at least a portion of the first set of signals having the first frequency range,
   wherein the second communications device is further configured to receive at least a portion of the information having the second frequency range and the first address, and
   wherein the access point is further configured to receive at least a portion of the information having the second frequency range and the second address.

21. A communication system as set forth in claim 16 wherein the wireless wide-area network includes a metropolitan-area network.

22. A communications system as set forth in claim 16 wherein the infrastructure comprises a satellite infrastructure.

23. A method of controlling the flow of information from a high-speed wide-area network to a plurality of mobile wireless devices, the method comprising:
   at a premises,
      connecting at least one switch with a general purpose infrastructure that provides the high-speed wide-area network,
      connecting an access point with the at least one switch, the access point having a controller and an antenna, the access point supporting a wireless wide-area network with the plurality of mobile wireless devices;
   receiving information at the switch from the high-speed wide-area network, the information including information having a first characteristic and information having a second characteristic, each of the characteristics being different;
   partitioning the information at the switch based at least in part on the first and second characteristics;
   wirelessly transmitting at least a portion of the partitioned information from the access point to the plurality of mobile wireless devices;
   wirelessly receiving further information at the access point from the plurality of mobile wireless devices; and
   wherein the information wirelessly communicated to and from the access point and the plurality of mobile wireless devices supports at least one of audio and video.

24. A method as set forth in claim 23 wherein the information includes a first set of signals having a first frequency range and a second set signals having a second frequency range,
   wherein the first characteristic is based at least in part on the first frequency range and the second characteristic is based at least in part on the second frequency range, and
   wherein the partitioning of the information includes partitioning the information having the first frequency range from the information having the second frequency range.

25. A method as set forth is claim 23,
   wherein the receiving information step includes receiving information having first, second and third characteristics; and
   wherein the wirelessly transmitting step includes wirelessly transmitting at least a portion of the information having the third characteristic to the wireless device.

26. A method as set forth in claim 23 wherein the wide-area network includes a metropolitan-area network.

27. A method as set forth in claim 23 and further comprising:
   at the premises,
      transmitting at least a portion of the information having the first characteristic to a first communications device.

28. A method as set forth in claim 27 and further comprising:
   at the premises,
      transmitting at least a portion of the information having the second characteristic to the second communications device.

29. A method as set forth in claim 23 wherein the infrastructure comprises a satellite infrastructure.

30. A method of controlling the flow of information from a high-speed wide-area network to a plurality of mobile wireless devices, the method comprising:
   at a premises,
      connecting at least one switch with a general purpose infrastructure that provides the high-speed wide-area network;
      connecting an access point with the at least one switch, the access point having a controller and an antenna, the access point supporting a wireless wide-area network with the plurality of mobile wireless devices;
   receiving information at the switch from the high-speed wide-area network, the information including information having a first characteristic and information having a second characteristic, each of the characteristics being different;

partitioning the information at the switch based at least in part on the first and second characteristics;

wirelessly transmitting at least a portion of the partitioned information from the access point to the plurality of mobile wireless devices;

wirelessly receiving further information at the access point from the plurality of mobile wireless devices;

wherein the information wirelessly communicated to and from the access point and the plurality of mobile wireless devices supports at least one of audio and video;

wherein the information includes data packets having a first address and data packets having a second address, wherein the first characteristic is based at least in part on the first address and the second characteristic is based at least in part on the second address, and wherein the partitioning of the information includes partitioning the data packets having the first address from data packets having the second address.

31. A method as set forth in claim 30 wherein the information includes a first set of signals having a first frequency range and a second set signals having a second frequency range, wherein the first characteristic is further based on the first frequency range, and wherein the partitioning of the information includes partitioning the information having the first frequency range from the information having the second frequency range.

32. A method of controlling the flow of information from a high-speed wide-area network to a plurality of mobile wireless devices, the method comprising:

at a premises, connecting at least one switch with a general purpose infrastructure that provides the high-speed wide-area network;

connecting an access point with the at least one switch, the access point having a controller and an antenna, the access point supporting a wireless wide-area network with the plurality of mobile wireless devices;

receiving information at the switch from the high-speed wide-area network, the information including information having a first characteristic and information having a second characteristic, each of the characteristics being different;

partitioning the information at the switch based at least in part on the first and second characteristics;

wirelessly transmitting at least a portion of the partitioned information from the access point to the plurality of mobile wireless devices;

wirelessly receiving further information at the access point from the plurality of mobile wireless devices;

wherein the information wirelessly communicated to and from the access point and the plurality of mobile wireless devices supports at least one of audio and video;

wherein the information includes information having a first code and information having a second code, wherein the first characteristic is based at least in part on the first code and the second characteristic is based at least in part on the second code, and wherein the partitioning of the information includes partitioning the information having the first code from information having the second code.

33. A method as set forth in claim 32 wherein the information includes a first set of signals having a first frequency range and a second set signals having a second frequency range, wherein the first characteristic is further based on the first frequency range, and wherein the partitioning of the information includes partitioning the information having the first frequency range from the information having the second frequency range.

* * * * *